United States Patent [19]

Benkosky et al.

[11] Patent Number: 5,509,265
[45] Date of Patent: Apr. 23, 1996

[54] OPERATIONAL SIGNAL STABILITY MEANS FOR TURBINE

[75] Inventors: Leonard A. Benkosky, Granger; Timothy F. Wiegand, South Bend, both of Ind.

[73] Assignee: AlliedSignal Inc., Morristown, N.J.

[21] Appl. No.: 377,065

[22] Filed: Jan. 23, 1995

[51] Int. Cl.$^6$ ............................................. F02C 9/28
[52] U.S. Cl. ............................... 60/39.161; 60/39.281
[58] Field of Search ........................... 60/39.161, 39.281

[56] References Cited

U.S. PATENT DOCUMENTS

| | | | |
|---|---|---|---|
| 3,587,229 | 6/1971 | Peczkowsky | 60/39.281 |
| 3,777,478 | 12/1973 | Moore | 60/39.281 |
| 5,072,578 | 12/1991 | Moore | 60/39.281 |

*Primary Examiner*—Louis J. Casaregola
*Attorney, Agent, or Firm*—Leo H. McCormick, Jr.; Larry J. Palguta

[57] ABSTRACT

An accumulator means connected to a passageway in a control system of a gas turbine engine for increasing the volume of a first operational fluid at control pressure Pg supplied to a reset means associated with a power lever when the fluid pressure Po in a second operational fluid is at a predetermined level to modify the time constants in operating the control system and allow fuel supplied to a combustion chamber to maintain a smooth operation for the gas turbine engine.

9 Claims, 3 Drawing Sheets

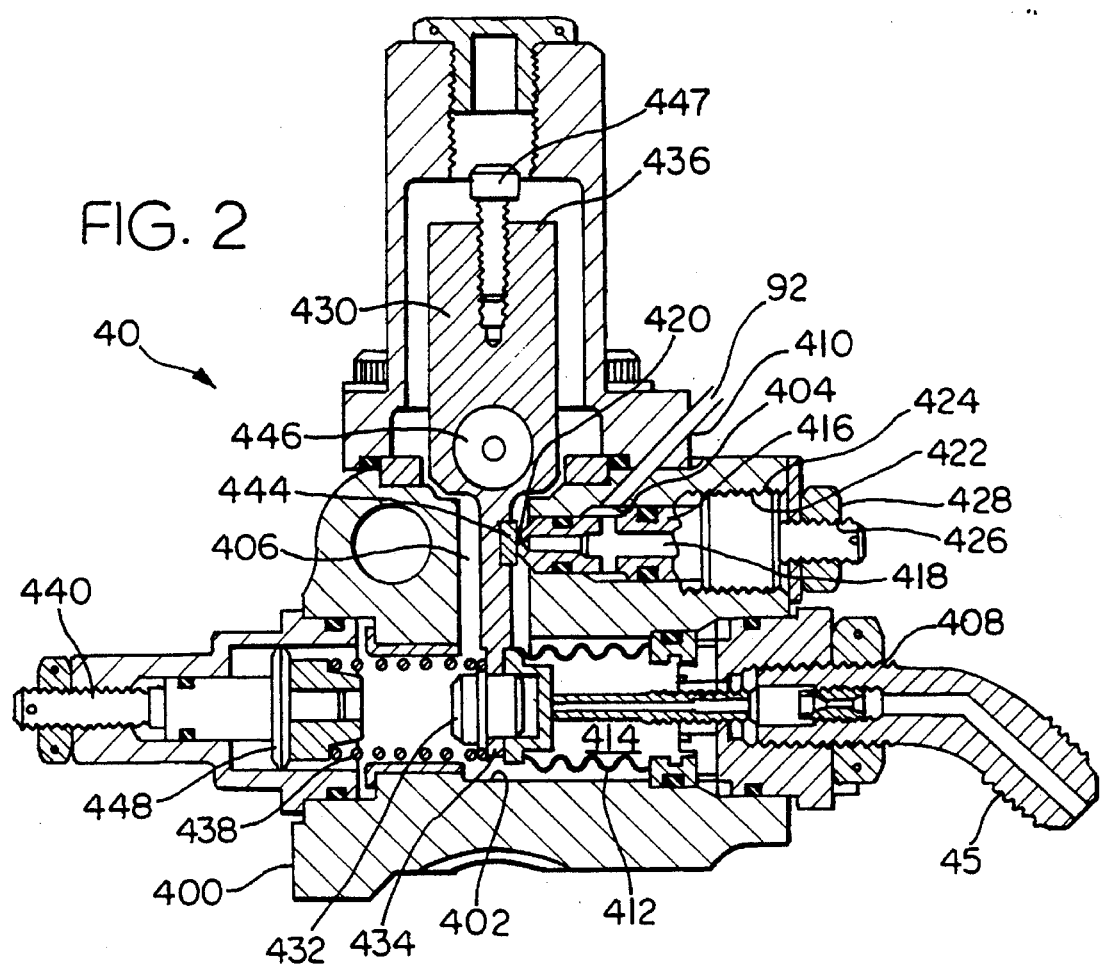
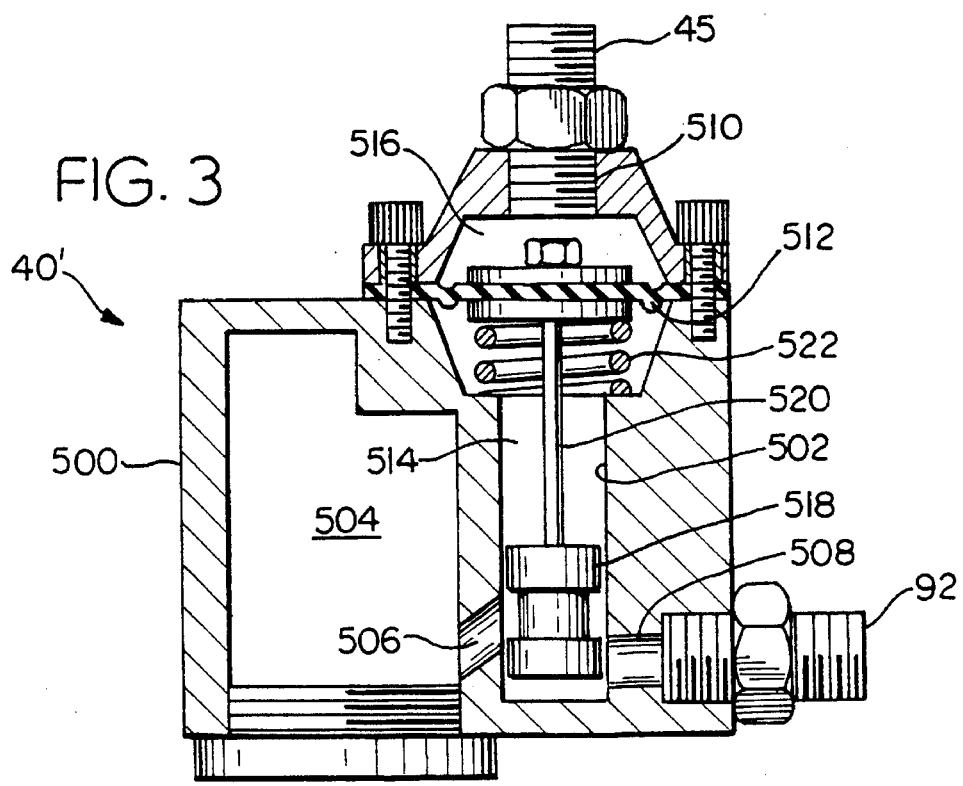

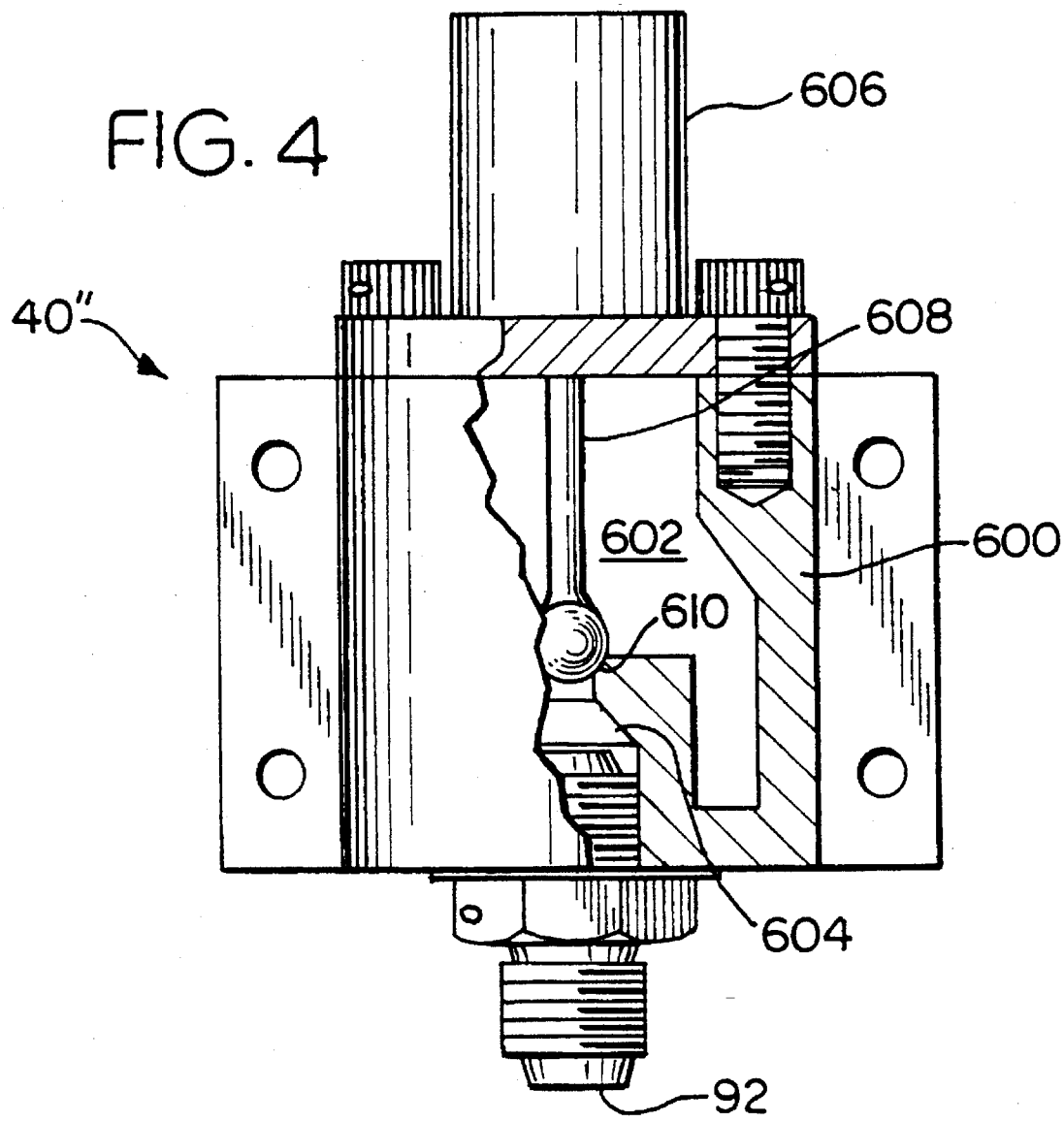

OPERATIONAL SIGNAL STABILITY MEANS FOR TURBINE

This invention relates to means for stabilizing the operational signal for a power turbine as a function of a pressure differential between a governor control pressure Pg and a torque engine oil pressure Po to reduce the time constants in the operation of a control system and maintain a substantially smooth rotation of a turbine driven by an air compressor.

BACKGROUND OF THE INVENTION

Gas turbine engine used to power helicopters normally have a built in fuel schedule which is based on the operation at sea level and at a temperature of 59° F. U.S. Pat. Nos. 3,587,229 and 3,777,478 typical fuel control systems for such gas turbine engines. U.S. Pat. No. 5,072,578 discloses an improvement for such fuel control systems to provide for a correction for temperature and altitude. This system operates in a satisfactory manner, however, it has been determined under certain conditions a collective pull on an input member by an operator may result in droop, a torque spike or rotor torsional vibration.

SUMMARY OF THE INVENTION

In the present invention, the control system for a gas turbine engine is modified through the addition of an accumulator arrangement which is connected to a passageway communicating operational fluid pressure Pg to a reset mechanism associated with an input control. The accumulator arrangement is only activated if a predetermined pressure differential occurs between the operational fluid pressure Pg and a torque oil fluid pressure Po. The torque oil fluid pressure Po is generated as a result of rotation of the power turbine in response to combustion of fuel in the combustion chamber. During normal operation, the operational fluid pressure Pg which is developed as a function of an output from a governor associated with the power turbine is communicated to and with a regulated fluid pressure Pr derived from the compressor discharge pressure Pc controls the operation of the reset mechanism through which a metering valve controls the supply of fuel to the combustion chamber. However, under certain circumstances wherein the torque oil pressure Po is at a predetermined level it is desirable to modify the time constants in the system by reducing the volume of the fluid at fluid pressure Pg available at the reset mechanism and allow the fluid pressure Pg to have a greater impact the reset mechanism such that the metering valve responds to an operator input by altering the flow rate of fuel to flow to the combustion chamber to maintain a smooth rotation of the turbine.

An object of this invention is to provide a control system with structure to reduce the implantation of an operational response from an operator during relative low rotational torque in a power turbine and to maintain smooth rotation free of vibration during relative high rotational torque.

A further object of this invention is to attenuate torsional spikes that may occur in response to an input signal communicated to a metering valve and thereby stabilize the rotation of a power turbine.

A further object of this invention is to provide structure to permit a reset mechanism to rapidly respond to an operator input signal by modifying the time constants that can effect system response such as the development of rotor droop.

The addition of an accumulator structure for a control system provided an advantage of providing a more rapid response to an input signal while at the same time reducing the likelihood of rotor torsional vibration that may occur as a result of communication of fuel to a combustion chamber in response to such input signal.

The objects and advantages of this invention should be apparent from reading the specification while viewing the drawing.

BRIEF DESCRIPTION OF THE DRAWINGS

FIG. 2 is an enlarged view of a preferred embodiment of the accumulator apparatus of FIG. 1.

FIG. 3 is an enlarged view of a simplified accumulator apparatus for use in the control system of FIG. 1; and FIG. 4 is an enlarged view of an additional accumulator apparatus for use in the control system of Figure.

DETAILED DESCRIPTION OF THE INVENTION

Figure 1:
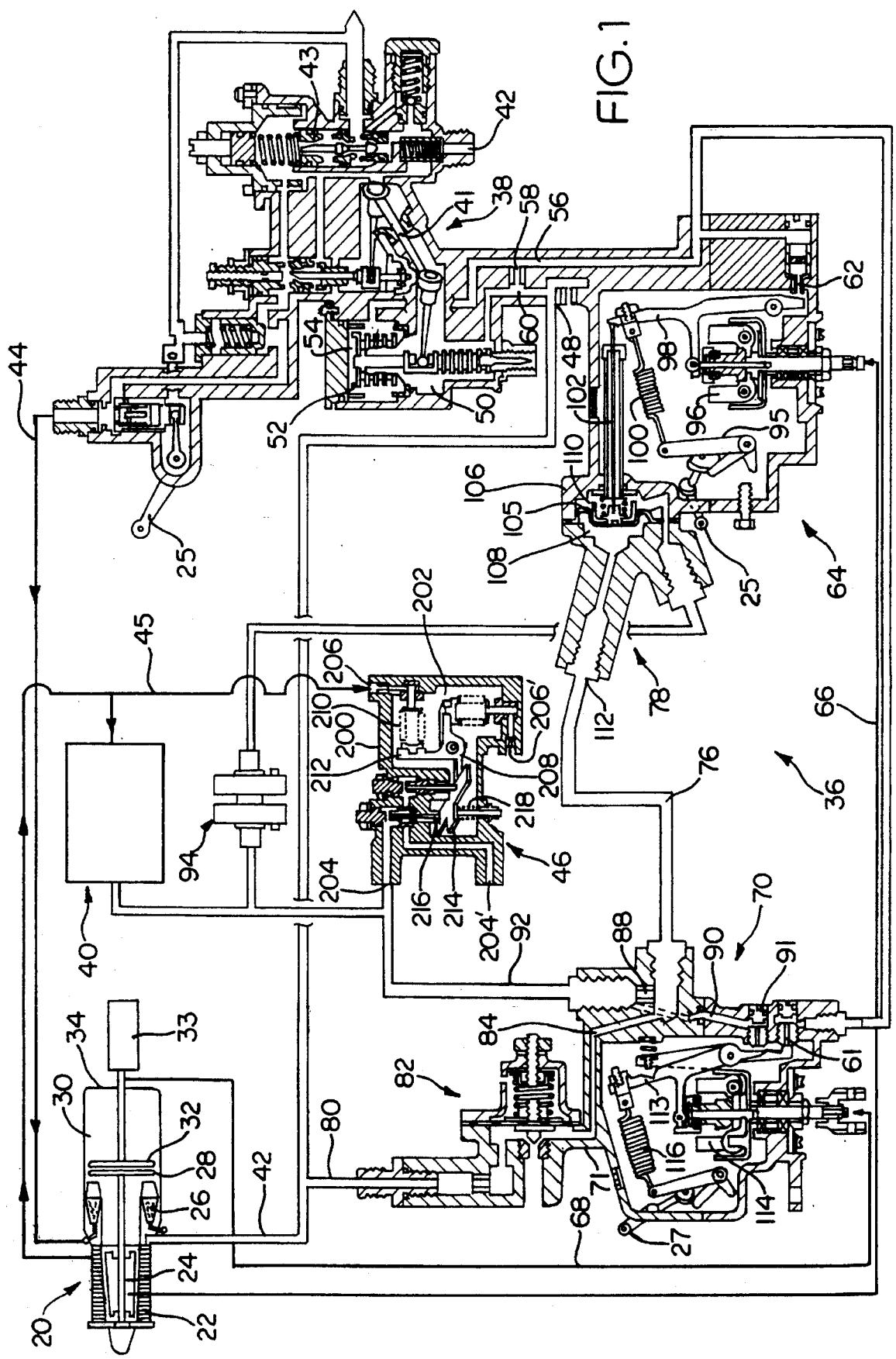
FIG. 1 is a schematic illustration of a gas turbine engine of the free turbine type having a fuel control system including an accumulator apparatus as defined by the present invention.

The gas turbine 20 shown in FIG. 1 has a gas generator section 22 including an air compressor 24, a combustion chamber 26 and a turbine 28 which drives compressor 24 and a power generating section 30 including a free or power turbine 32 which rotates independently of turbine 28 in response to passage of exhaust gases being directed through nozzle 34 to the surrounding environment from combustion chamber 26. The free or power turbine 32 is suitably connected to an external load 33 which for the purposes of the following description will be the rotatable blades or air foils of a helicopter.

Fuel is supplied to the combustion chamber 26 in response to an applied input to power lever 25 to a control system 36. The control system 36 for the gas turbine 20, except for the accumulator apparatus 40 of the present invention, is conventional and of the type disclosed in U.S. Pat. No. 3,587,229 which is incorporated by reference herein for specific details of the operation and structure thereof which is not essential to an understanding of the present invention. In summary, the control system 36 includes a fluid pressure responsive metering valve 38 responsive to an operator input as received by a power lever 25 to control the supply of fuel from a source 42 to the combustion chamber 26 through a supply conduit 44. The various components and in particularly metering valve 38 in control system 36 simultaneously receive a first operational fluid derived from air that is communicated from the gas generator section 22 by conduit or passageway 42 while a second operational fluid derived from the torque oil pressure is communicated from gas generator section 22 by conduit or passageway 45 to a torque limiter assembly 46 and the accumulator apparatus 40 of the present invention. The first operational fluid when presented to passageway 42 has a fluid pressure equal to the compressor discharge pressure Pc while the second operational fluid has a fluid pressure equal to the operational torque oil pressure Po developed by an oil pump, not shown, through the rotational torque in turbine 28.

The first operational fluid in passageway 42 is communicated to by metering valve 38 through port 48 for distribution through passage 60 to chamber 50 which houses bellows means 52. Bellows means 52 separates chamber 50 from chamber 54 which is connected to passageway 56. One side of bellows means 52 is exposed to the fluid pressure Pc in chamber 50 while the other side of the bellows means 52 is exposed to the fluid pressure Py in chamber 54. Passageway 56 is connected to passage 60 through a restrictive or bleed orifice 58 to control the rate of flow of the first operational fluid from passage 60 to passageway 56. Passageway 56 is connected to a deceleration bleed orifice 62 located the housing for governor 64 and to bleed orifice 61 in governor 70. The functional operation of governor 64, as modified by inputs from power turbine governor 70 and sensed speed of the drive turbine 28, controls the communication of operational fluid from passageway 56 through bleed orifice 62 to develop fluid pressure Py.

Governor 64 receives an input from the drive turbine 28 through drive spline 66 while power turbine governor 70 receives input from the free turbine 32 through drive spline 68. The input which governors 64 and 70 receive through drive splines 66 and 68, respectively, is a function of the speed of each turbines 32 and 28. However, governor 70 also receives an independent input through lever 27 relating to a desired pitch of the rotors as inputted from an operator and this input is supplied to governor 64 through reset means 78 to jointly control the functional operation of metering valve 38.

The compressor discharge pressure Pc present in passageway 42 is communicated by conduit 80 to an air pressure regulator 82. Air pressure regulator 82 regulates the compressor discharge air supplied thereto to maintain a controlled source of air at a regulated pressure Pr which is directly supplied to governor 64 by way of passage 84 in housing 71 and conduit 76. A restrictive bleed 88 in passage 84 allows regulated fluid Pr to flow into a passageway 92 and develop a fluid pressure Pg which is supplied to reset means 78 by way of check valve 94 and to the power turbine governor 70 by way of passage 90 in housing 71.

The structure in governors 64 and 70 which is fully described in detail in U.S. Pat. No. 3,587,229 is only specifically described herein as is needed to understand the operation of control system 36 as modified through the inclusion of accumulator apparatus 40.

In more particular detail, governor 64 includes centrifugal speed weights 96 which impose a force against coacting pivotal mounted lever 98 whose movement controls the flow of operational fluid through vent opening in bleed orifice 62 to vary the effective area thereof. Change in the flow of operational fluid through this vent opening effects the development of control air fluid pressure Py which is communicated to chamber 54 in metering valve 38. Lever 98 is loaded with a reference force derived from a tension spring 100 located between lever 98 and lever 95 associated with the power lever 25. Lever 98 is also connected to reset means 78 through a rod 102 which is secured to a diaphragm 105. Diaphragm 105 is secured to housing 106 to separate chamber 108 from chamber 110. Chamber 108 is connected to conduit 76 by port 112 and directly receives regulated fluid pressure Pr while chamber 110 is connected to passageway or conduit 92 and receives operational fluid which has been modified to a fluid pressure Pg. Air from passage 92 is vented to the surrounding environment through passage 90 which communicates through vent 91 in governor 70. Flow of air through vent 91 is a function of the location of lever 113 as positioned by speed weights 114 responding to the rotational input from speed spline 68 and an input from pitch control lever 27. The position of lever 113 with respect to vent 91 controls the effective flow area from passage 90 and the air pressure Pg supplied to chamber 110 in the reset means 78. The position of lever 113 is a function of the input force applied through spring 116 from pitch control lever 27 and turbine rotation as communicated through spline 68 to control the development of a pressure differential Pr-Pg across diaphragm 105 of the reset means 78. The resulting force that develops across diaphragm 105 is applied by rod 102 to lever 98. Thus, the speed control for the gas generator turbine 28 is derived from gas generator governor 64 as a function of a fixed reference input force as established by the position of the power lever 25, an existing speed of turbine 28 as generated by speed weights 96 and an input from governor 70 which results in accurate and stable control for the gas turbine 20.

With the control system 36 it is desirable to include a torque limiter apparatus 46 to limit the fuel supplied to combustion chamber 26 by the metering valve 38 to assure that an overspeed or developed torque condition that could harm the structure of the gas turbine 20 or aircraft does not occur.

Torque limiter 46 has a housing 200 with a chamber 202 therein with a first port 204 connected to passage 92 to receive an input pressure Pg which is derived from the compressor discharge of turbine 28 and a second port 206 connected to conduit 45 to receive oil pressure Po which is derived from the an oil pump connected to the free turbine 32. A lever arrangement 208 pivotal secured to housing 200 has a first end 212 that engages a bellows 210 that extends from the port 206 and a second end 214 that is located adjacent a nozzle or vent 216 connected to port 204. Bellows 210 forms a sealed unit to prevent the communication of oil present in conduit 45 into chamber 202 which is essentially opened to and at the same pressure as the surrounding environment. A spring 218 secured to housing 200 acts on and urges the second end 214 toward nozzle or vent 216. Torque limiter 46 is designed to accommodate inputs from two separate turbines (only turbine 20 is shown) and as shown port 206' would receive an input relative to the oil pressure and port 204' would receive an input relative to the compressor discharge pressure of such another turbine. In operation, movement of bellows 210 by the oil pressure Po is opposed by spring 218 such that flow of the first operational fluid Pg through nozzle 216 is prevented and the fluid pressure Pg is communicated to reset means 78 to control the input to lever 98 until such time that the oil pressure Po as developed from torque applied to an oil pump overcomes spring 218 and allows communication of fluid pressure Pg from passageway or conduit 92 to chamber 202 and create a corresponding change in the pressure of the first operational fluid in conduit 92. This change in pressure in the operational fluid in passageway 92 is communicated to chamber 110 in reset means 78 to modify the development of the operational pressure differential across diaphragm 105. Thereafter, the force developed across diaphragm 105 is applied to lever 98 through rod 102 is correspondingly change and modify the flow of operational fluid through vent 62 such that Py is changed to Py'. Bellows 52 responds to the change in Py' by changing the operational force supplied through linkage 41 to operate the main fuel control mechanism 43 and modify the flow of fuel to combustion chamber 26 by way of conduit 44 and prevent the communication of fuel which could cause an overspeed condition.

When an operator applied an input force to power lever 25, the control system 36 time constants are such that under normal conditions a smooth transition occurs during acceleration from a current rotational speed to a desired increased rotational speed for the turbine 28. However, under certain conditions it is desirable to obtain a faster increase to in such speed without a delay caused by the sequential effect of the time constants in the control system 36. The accumulator apparatus 40 connected to conduit or passageway 92 is designed to function in response to a predetermined torque oil pressure Po to substantially eliminate such time constants and modify the operations metering valve 38 to provide for a rapid response through the fuel supplied to the combustion chamber 26 such that a smooth operation of the gas turbine 20.

A preferred accumulator apparatus 40 as shown in FIG. 2 has a housing 400 having a first bore 402, a second bore 404 and an interconnected to a cavity 406 which functions as an accumulator volume. Bore 402 has a first port 408 connected to conduit 45 receive oil pressure Po as developed by an oil pump which is normally driven by the rotation of air compressor 24 while bore 404 has a second port 410 connected to receive fluid pressure Pg as present in conduit 92. A bellows means 412 is secured to housing 400 and located in bore 402 defines a sealed chamber 414 within bore 402. The sealed chamber 414 assures that oil under pressure Po present in conduit 45 is not communicated into cavity 406 or bore 404. A restrictor assembly consisting of cylindrical member 416 located in bore 404 has a passage 418 therein to communicate fluid from port 410 to a nozzle 420 formed on the end thereof. Cylindrical member 416 has first threads 422 thereon which are mated with threads 424 on housing 400 and second threads 426 which are mated with locking nut 428 to adjust the position of nozzle 420 within bore 404 adjacent a lever 430. Lever 430 which is located in cavity 406 has a first end 434 attached to bellows member 412 by fastener 432 and a second end 436. A resilient means or spring 438 caged between a first adjustment means 440 and the fastener 432 provides a force which acts on bellows 41 2 to urge face or seat 444 on lever 430 toward nozzle 420. A pivot pin 446, secured to housing 400, extends through lever 430 to locate or align face 444 with nozzle 420. An adjustment means or screw 447 attached to the second end 436 of lever 430 can be screwed into or out of lever 430 to provide for a balanced load about pivot pin 446. In addition, the first adjustment means 440 has a shoulder which forms a base for retaining a plurality of bi-metal disc 448. The bi-metal disc 448 responds to changes in temperature such that a force applied to bellows member 412 by spring or resilient member 438 remains substantially constant with changes in the temperature of the surrounding environment.

During low power operations of the gas turbine 20, the accumulator apparatus 40 does not contribute to the input function of the control system 36 of metering valve 38. However, should Po exceed a predetermined value which would indicate that too much fuel is being supplied to combustion chamber 26 which could cause rotor torsional vibration, accumulator apparatus 40 becomes functional. Under such conditions, the oil pressure Po acts through bellows member 412 to overcome the force of spring or resilient member 438 and move lever 430 about pivot 446. As lever 430 moves about pivot 446, face 444 moves away from nozzle 420 to open cavity 406 to bore 404 and increase the total volume of the first operational fluid Pg in passage 92. This increase in total volume, through the addition of the space of cavity 406, is reflected in the operational fluid supplied to chamber 110 in the reset means 78 such that the development of Py is correspondingly modified and the operational input signal supplied to operate the metering valve changed to reflect such change in the fuel supplied to the combustion chamber 26. The space relationship between cylindrical body 416 and bore 404 is such that a leak path occurs between bore 404 and cavity 406 and as a result when face 444 moves away from nozzle 420 a smooth transition occurs since the fluid pressure in the cavity 406 approximates the fluid pressure Pg present at port 410. When the pressure differential between the oil pressure Po and operational fluid pressure Pg returns to an acceptable level, spring or resilient means 438 acts on and moves face 444 toward nozzle 420 to interrupt communication from bore 404 to cavity 406 and as a result the volume of the operational fluid in passageway 92 returns to a normal level for operating the reset means 78.

FIG. 3 is an illustration of a simplified accumulator apparatus 40' having a housing 500 with a bore 502 therein connected to a reservoir or cavity 504 by a passage 506. Cavity 504 functions as an accumulator volume for passageway 92. A diaphragm 512 attached to housing 500 separates bore 502 into a first chamber 514 connected to port 510 and a second chamber 51 6 connected to port 508. Chamber 514 is connected to conduit 92 through a first port 508 while chamber 516 is connected to conduit 45 through a second port 510. A spool or piston 518 attached to diaphragm 512 by linkage 520 is positioned in bore 502 by a resilient member or spring 522 to restrict free communication of the first operational fluid having a fluid pressure Pg from bore 502 through passage 506 to reservoir or accumulator cavity 504. As described above, when the differential between fluid pressure Po in chamber 516 and Pg in chamber 514 is sufficient overcome spring 522, piston or spool 518 moves to allow free communication between chamber 514 and reservoir 504 and expand the volume of the first operational fluid and reduce the volume available to control the operation of the reset means 78. When the difference in pressure between Po and Pg reaches to an acceptable level, resilient means or spring 522 returns piston 518 to a closure position as shown in FIG. 3 to limit the communication of the operational fluid from chamber 514 to cavity 504 and return the volume in passageway 92 of the control system 36 to the normal amount.

For some applications, it may be desirable to have an electrical responsive accumulator apparatus 40" as shown in FIG. 4. The torque oil pressure developed by an oil pump is communicated along with other measured parameters to an engine controller, not shown. The engine controller evaluates the operation of the gas turbine 20 from signals received and when a current torque oil pressure Po signal developed by an oil pump through rotation of air compressor 24 is at a predetermined value, a signal activates the accumulator apparatus 40" to provide for a modification in the fuel supplied to combustion chamber 26 of turbine 20.

In more particular detail, accumulator apparatus 40" has a housing 600 has a chamber 602 therein connected to passageway 92 through a port 604. A solenoid valve 606 connected to the engine controller and attached to housing 600 has a plunger 608 which is resiliently positioned against a face or seat 610 which surrounds port 604. In response to an operational signal from the engine controller, solenoid 606 is activated such that plunger 608 is moved off seat 610 and the volume of operational fluid in passage 92 expanded as chamber 602 is added to passageway 92 such that the operational fluid supplied to chamber 110 is correspondingly changed and the development of Py modified such that the fuel supplied to combustion chamber 26 corresponds to an operational schedule through a reduction in a time constant for control system 36 maintain a smooth rotation for the rotor without an increase in torsional vibration in the turbine 20.

We claim:

1. In a gas turbine engine having at least one compressor connected to a power turbine, a housing with a first chamber and a second chamber located therein, a main fuel passage connected to a source of fuel, a metering valve located in said main fuel passage for controlling the flow of fuel from the source to a combustion chamber, said compressor rotating as a result of the combustion of fuel in the combustion chamber to develop a compressor discharge pressure Pc in a first operational fluid and oil pressure Po in second operational fluid, said power turbine responding to the development of said compressor discharge pressure by rotating, a control system for operating said metering valve in accordance with a fuel supply schedule corresponding to a desired rotational speed for said compressor, first bellows means for separating a first chamber from a second chamber and being connected to said metering valve, a first passageway for communicating compressor discharge pressure Pc to said first chamber, a first bleed orifice through which said first passageway is connected to a second passageway connected with said second chamber and to a second bleed orifice through which said second passageway is communicated to the surrounding environment, first governor means having a first lever arrangement having a face on the end thereof which is located adjacent said second bleed orifice, said first lever arrangement being responsive to an input signal applied to a power lever by an operator and the rotational speed of said compressor for controlling flow of operational fluid from said second passageway through said second bleed orifice to establish an operational fluid pressure Py in the operational fluid presented to said second chamber, said bellows means responding to a pressure differential between compressor discharge Pc in the first chamber and an operational pressure Py in the second chamber to provide said metering valve with an operation input to control fuel supplied to said combustion chamber in accordance with the fuel supply schedule, second governor means responsive to the rotational speed of said power turbine having a second lever arrangement with a first face thereon which is located adjacent a third bleed orifice connected to said second passageway and a second face thereon which is located adjacent a fourth bleed orifice connected to a third passageway, pressure regulator means connected to receive compressor discharge pressure Pc and develop a regulated pressure Pr, a fifth bleed orifice through which regulated pressure Pr is presented to said third passageway, said first face on said second lever controlling the flow of operational fluid through said third bleed orifice from said second passageway as a function of the rotational speed of said power turbine and said second face on said second lever controlling the flow of regulated pressure Pr through said fourth bleed orifice to create a control pressure Pg, reset means connected to said first lever means and responsive to a pressure differential developed between said regulated pressure Pr and control pressure Pg for controlling the development of said operational pressure Py as a function of the rotational speed of said power turbine, limiter means connected to said third passageway for limiting the communication of said control pressure Pg to said reset means as a function of the development of said oil pressure Po in said second operational fluid, the improvement comprising:

accumulator means connected to said third passageway and responsive to a predetermined fluid pressure Po of said second operational fluid for increasing the volume of operational fluid at control pressure Pg to modify the time constants in operating said reset means and change the operation of said control means such that the fuel supplied to said combustion chamber provides a smooth operation of said gas turbine engine.

2. The gas turbine engine as recited in claim 1 wherein said accumulator means includes:

a housing having a bore therein with a first port connected to receive said second operational fluid having a fluid pressure Po, a second port connected to-receive said first operational fluid having a fluid pressure Pg and a passage connected to a cavity;

diaphragm means secured to said housing for separating said bore into a first chamber and a second chamber, said first chamber being connected to said first port and said second chamber being connected to said second port; and piston means connected to said diaphragm means, said piston means being moved by said diaphragm means for controlling communication between said second port and said passage as a function of a pressure differential created across said diaphragm means between the fluid pressure Po in said second operational fluid and the fluid pressure Pg to provide communication between said third passageway and said cavity and provide for said increase in the volume of the operational fluid supplied to said reset means.

3. The gas turbine engine as recited in claim 1 wherein said accumulator means includes:

a housing having first bore, a second bore and a cavity therein; said first bore being connected to receive said first operational fluid having a fluid pressure Pg, said second bore being connected to receive said second operational fluid having a fluid pressure Po, and said cavity being connected to said first bore;

nozzle means located in said housing through which said first operational fluid is communicated to said cavity;

linkage means located in said cavity and having a face thereon located in alignment with said nozzle means; and second bellows means located in said second bore and responsive to a fluid pressure Po in said second operational fluid for providing said linkage means with an input to position said face with respect to said nozzle and control the communication of said first operational fluid to said cavity and increase the volume of the first operational fluid available to said reset means in response to a predetermined pressure differential between Po and Pg.

4. The gas turbine engine as recited in claim 3 wherein said accumulator means further includes:

resilient means located in said second bore and acting on said second bellows means and said linkage means to initially urge said face into engagement with said nozzle to prevent communication of said first operational fluid with a fluid pressure Pg from said first bore into said cavity.

5. The gas turbine engine as recited in claim 4 wherein said accumulator means further includes:

temperature compensation means connected to said resilient means to maintain substantially a same force on said bellows means with changes in the temperature of the surrounding environment.

6. The gas turbine engine as recited in claim 5 wherein said linkage means includes:

third lever means having a first end located between said resilient means and said second bellows means and a second end;

a pivot pin secured to said housing and extending through said third lever for locating said face in alignment with said nozzle; and first adjustment means attached to said second end of said third lever means to provide for a balanced load about said pivot pin.

7. The gas turbine engine as recited in claim 6 wherein said accumulator means further includes:

second adjustment means connected to said resilient means to position said face on said third lever means adjacent said nozzle to assure that communication from said first bore is restricted until the fluid pressure Pc in said second operational fluid is sufficient to develop a pressure differential sufficient to overcome the force of said resilient means and the fluid pressure Pg in the first operational fluid.

8. The gas turbine engine as recited in claim 1 wherein said accumulator means includes:

a housing having a chamber therein with a port in communication with said third passageway; and a solenoid valve responsive to a control signal derived from the fluid pressure Po in said second operational fluid for moving a plunger off a seat to allow communication of said first operational fluid having a fluid pressure Pg to be communicated into said chamber and increase the volume of the first operational fluid available for operating said reset means.

9. In a gas turbine having at least one compressor connected to a power turbine, a metering valve connected to a source of fuel for controlling the rate of flow of fuel from the source to a combustion chamber, said compressor rotating as a result of the combustion of fuel in the combustion chamber to develop a compressor discharge pressure Pc in a first operational fluid and oil pressure Po in second operational fluid, said power turbine responding to said compressor discharge pressure by rotating, a control system for supplying said metering valve with an operational signal in accordance with a fuel supply schedule corresponding to a desired rotational speed for said compressor, a first governor responsive to the rotation speed of said compressor and a first operator input applied to a first power lever and a second governor being responsive to the rotation speed of said power turbine and a second operator input applied to a second power lever, said first governor supplying said metering valve with a control input as a function the compressor discharge fluid pressure, said second governor means being connected to said first governor through reset means for controlling the development of said control input, the improvement comprising:

accumulator means for changing the volume of the first operational fluid Pg communicated to said reset means is responsive to the development of a predetermined fluid pressure Po in said second operational fluid such that the time constants required to operate said reset means are reduced and the fuel supplied to said combustion chamber maintains a smooth operation for said gas turbine.

\* \* \* \* \*